… …

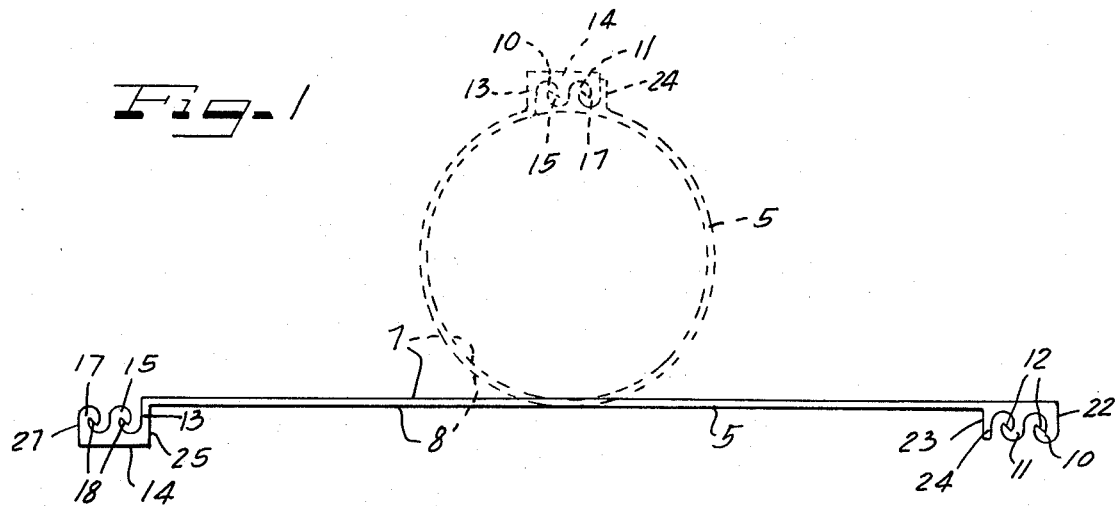
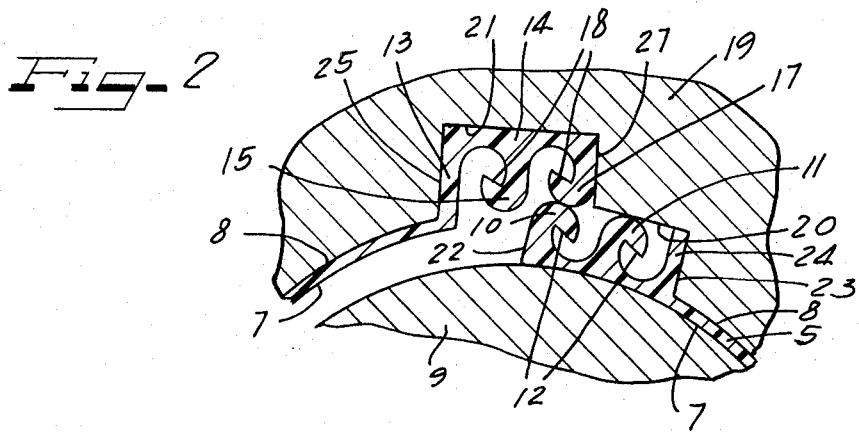
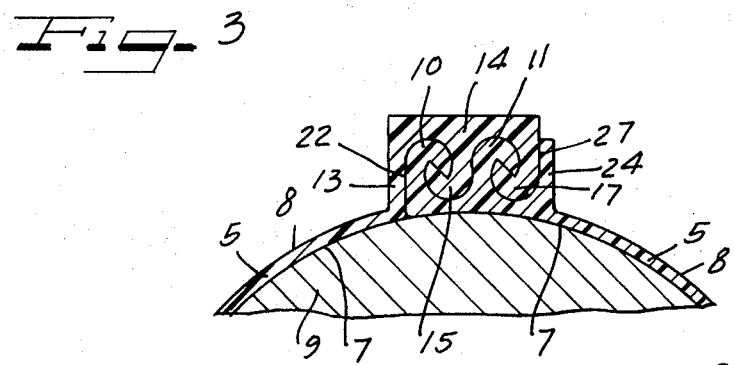
INVENTOR.
STEVEN AUSNIT

United States Patent Office 3,654,049
Patented Apr. 4, 1972

3,654,049
SELF-RETAINING EXTRUDED PLASTIC WRAP MEMBER
Steven Ausnit, 124 E. 61st St., New York, N.Y. 10021
Filed Apr. 30, 1970, Ser. No. 33,307
Int. Cl. A44b 19/10, 19/14
U.S. Cl. 161—7                3 Claims

ABSTRACT OF THE DISCLOSURE

A self-retaining, one-piece, extruded plastic wrap member having a sheet-like flexible body with an object-embracing inner face and longitudinal edges which are arranged to be in edge-to-edge joint abutment when the body is wrapped about an elongated object with the inner face backed in substantially continuous engagement with the article at both sides of the joint and having a complementary interlock structure provided along the edges on the opposite outer face of the body to secure it about the object.

---

This invention relates to the wrapping of elongated objects and is more particularly concerned with a new and improved self-retaining, one-piece, extruded plastic wrap member adapted for circumferentially enclosing an elongated object.

Elongated members such as pipes or other tubes and cables, or at least lengths of such elongated members may desirably be sheathed optionally for any of various reasons such as temperature insulation, electrical insulation, for protection against environmental factors such as fluid, either gas or liquid, damaging chemical substances, dirt, etc., or for other purposes. Where it is not possible or practical to provide an insulating or protective sheath about the elongated object as original equipment or where such original sheath becomes damaged and has to be replaced, it is necessary to apply the sheath as a wrap to the object at a later time. For example, on certain types of cable where the opposite ends of the cable has devices attached thereto, or the cable is attached at one or both of its ends to an apparatus with a coupling device and the cable or the sheath becomes damaged, it is quicker, easier and less expensive to install a wrap type of sheath than to replace a seamless tube. Furthermore, attaching the wrap in a lead-proof manner presents a problem, especially when it is necessary to accomplish the wrapping in a place where it is not feasible to have sophisticated binding or fusing or bonding or similar joint securing means.

According to the present invention, the foregoing and other disadvantages, shortcomings, inefficiencies and problems are overcome by providing a new and improved self-retaining, one-piece, extruded plastic wrap adapted for circumferentially enclosing an elongated object simply, efficiently and effectively.

An object of the invention is to provide a new and improved self-retaining, one-piece, extruded plastic wrap having new and improved securing means.

Another object of the invention is to provide new and improved integral joint closing means for self-retaining, one-piece, extruded plastic wrap members wherein the underlying wrapped object cooperates with the retaining means to improve its efficiency.

A further object of the invention is to provide a new and improved wrap member of the character indicated provided with an efficient zipper-type interlock closure structure.

Still another object of the invention is to provide a new and improved wrap of the character indicated which is adapted to be substantially permanently zippered by a slider arrangement utilizing the object being wrapped as a backing for the zipper closure for effecting interlocking of the zipper.

Other objects, features and advantages of the invention will be readily apparent from the following description of a preferred embodiment thereof, taken in conjunction with the accompanying drawings, although variations and modifications may be effected without departing from the spirit and scope of the novel concepts embodied in the disclosure, and in which:

FIG. 1 is an end elevational view of a wrap member embodying features of the invention;

FIG. 2 is an enlarged fragmentary sectional view demonstrating how the fastener or zipper is brought into interlocking relation; and FIG. 3 is a similar fragmentary sectional detail view showing the zipper closure in the interlocked joint-sealing and wrap-maintaining condition.

As shown in FIG. 1, the wrap member comprises a sheet-like flexible body 5 having an object-embracing or inner face 7, and an opposite or outer face 8. In length, the body 5 is dimensioned to accommodate the object to which it is to be applied as a sheath, while in width the body 5 is dimensioned to effect as snug a wrapping engagement as desired about the object. By having the body 5 not only flexible but also resilient or elastic and slightly narrower than the circumference of the object to be wrapped, the body can be stretched into the wrapped position whereby to maintain a snug, tight, non-slip engagement with the elongated object to which applied. Desirably, the wrap member is made from a material which can be easily and economically manufactured by an extrusion process. Suitable materials for this purpose comprise vinyl, polyethylene or other thermoplastic materials or compositions which will provide the desired results as to flexibility, resilience or elasticity, coloration, opaqueness, transparency, chemical resistance, resistance to oxidation, temperature compatibility, permeability or impermeability, and like desirable characteristics. The body 5 may be of whatever thickness or gauge desired or suitable for the intended purpose. It may be initially flat as shown in FIG. 1 or pre-bent or curved either or both transversely and longitudinally.

Means are provided for circumferentially enclosing and self-retainingly securing the wrap member on and about an elongated object 9, whatever its nature may be, such as a cable, tube or the like. To this end, the opposite longitudinal edges on the body 5 are arranged to be brought together in edge-to-edge joint abutment when the body is wrapped about the object 9 and with the object-embracing face 7 backed in coplanar relation against the object at both sides of the joint, as shown in FIG. 3. Complementary fastener or plastic zipper interlocking means are provided on the respective longitudinal margins of the body 5 adjacent to said longitudinal edges and situated on the outer face 8. On one longitudinal margin a plurality, herein two, interlock hooks 10 and 11 are provided integral in one piece with the body 5 and projecting from the face 8 adjacent to and along the one edge. As shown, the hooks are spaced from one another in parallel relation with their hook heads and protruding teeth surfaces turned away from the adjacent edge and with the back of the hook 10 aligned with the edge. Respective planar engaging hook teeth surfaces 12 are in respective oblique parallel planes which intersect the plane of the surface 8.

On the other longitudinal margin a complementary interlock structure is provided that is integral with and connected to the face 8 by a web flange or shoulder 13 extending in a plane generally normal to such face 8 and adjacent to the second edge of the body 5 to which it is attached. Extending integrally from the outer end of the flange or shoulder 13 and beyond the second edge in a direction away therefrom so as to enable the overlying of the hooks 10 and 11 is a fastener strip 14 having spaced parallel interlock hooks 15 and 17 projecting generally toward the plane of the face 8 and complementary to and interlockingly engageable with the hooks 10 and 11, respectively. Planar engaging hook teeth surfaces 18 on the hooks 15 and 17 are complementary to and interengageable with the teeth surfaces 12. As will be observed, each of the interlock structures has recesses shaped complementary to and receptive of the respective hooks of the other of the structures so as to provide a substantially snug interlock relationship in the fastened assembly.

Further, it will be noted that the connecting flange or shoulder 13 is of a width to offset the hooks 15 and 17 relative to the inner face 7 of the body 5 sufficiently to compensate adequately for the thickness of the body 5 underlying the heads of the hooks 10 and 11 so that in the interlocked condition of the fastener not only will the edges of the body be brought together in edge-to-edge joint abutment, but the object-embracing face 7 is backed in coplanar relation against the object 9 at both sides of the joint. This relationship has plural advantages, not the least of which is that it makes possible a tight fit of the wrap member around the object with which it is being assembled so that the fastener is closed by utilizing the surface of the object 9 being sheathed or wrapped as a bottom, base or anvil against which pressure can be exerted to snap the resiliently yieldable fastener hooks into interlocking assembly. For example, as shown in FIG. 2 a slider 19 which does not have any customary separating wedge or bottom plate is adapted to effect the fastener closing in cooperation with the object 9. For this purpose, the slider has a slider track channel groove 20 for the outwardly projecting interlock structure and a complementary slider track channel groove 21 for the outwardly offset but inwardly projecting complementary interlock structure. These grooves converge to draw the interlock structures toward one another and into the fastened superimposed relation as the slider is run longitudinally along the object 9. This function is made possible by circumferentially opposite longitudinal shoulder surfaces 22 and 23 engageable with sides of the slider groove 20 and shoulder surfaces 25 and 27 engageable with the sides of the slider groove 21. In this manner the interlock structure containing hooks 10 and 11 is guided by the track surfaces of the groove 20 toward and into convergence with the other interlock structure containing hooks 15 and 17, which in turn is guided by the track surfaces of the groove 21 so that with the required pressure, the hooks 15 and 17 can be interlocked with the hooks 10 and 11 which are bottomed against the object 9 through the underlying marginal portion of the body 5. The arrangement is such that the heads of the hooks 15 and 17 are moved across the heads of the hooks 10 and 11, respectively, and the hooks 15 and 17 are then pressed inwardly until by mutual resilient flexing the teeth surface portions of the hook heads move past one another and snap into mutually interlocking relation, and in this instance permanent, sealing wrap-maintaining fastener locked engagement.

Another important advantage of the firm coplanar engagement of the perimeter of the object 9 by the surface 7 of the body 5, especially at each margin along the joint secured by the fastener, resides in that since both portions of the joined body web are in the same curved plane and intimately bottomed against the object perimeter, especially in the marginal area along the joint and back of the fastener and thereby blocking the directions of separation movement of the interlocking hooks of the fastener, there is virtually no possibility of the interlocked hooks bending sufficiently even when subjected to some rather severe planar pull exerted through the body 5. In order to permit release bending and tilting of the hooks it would be necessary for the fastener structures to yield in an inward direction toward the object 9 but since the margins of the body 5 along the joint where the edges abut and laterally therebeyond and more particularly in the entire area of the fastener firmly bottoms against the surface of the object 9, such yielding and bending are generally precluded. Resistance to separation is also enhanced by the back-up of the hook 10 against the flange 13 which is held positively against yielding away from the hook by the firm anchorage of the strip 14 through its hooks with the hooks 10 and 11. Resistance to separation is also enhanced by the back-up afforded by the shoulder flange 24 against the back of the hook 17. Further, the strip 14 is desirably of a thickness, in this instance substantially greater than the thickness of the body 5, which will resist yielding after the fastener has been secured together. It will thus be apparent that after the fastener has been secured together, the wrap member is held quite positively and permanently in the object-sheathing condition. This sheathing condition may be under at least slight tension as enabled by the elasticity of the wrap body 5. The fastener elements are thoroughly interlocked and backed up so as to preclude separation under normal conditions. The inherent resilient flexibility characteristics of the wrapper material permit flexing in planes across the length of the fastener sufficient to accommodate possible flexing movements or bending of the elongated object 9 to which the wrap or sheath has been applied, and similar bending of the fastener, without releasing its interlocked portions due to any of these bending stresses or opening of the sealed joint closed thereby.

It will be understood that variations and modifications may be effected without departing from the spirit and scope of the novel concepts of this invention.

I claim as my invention:

1. A self-retaining, one-piece, extruded plastic wrap member adapted for circumferentially enclosing an elongated object, said member comprising:

a sheet-like flexible body having an object-embracing inner face and an opposite outer face, with opposite longitudinal edges on the body arranged to be brought together in edge-to-edge joint confrontation when the body is wrapped about the object with said inner face backed in coplanar relation against the object at both sides of the joint;

a first interlock structure on said outer face adjacent to and along one of said edges;

a second complementary interlock structure connected to said outer face along the other of said edges and extending therebeyond to overlie and engage lockingly with said first-mentioned structure to maintain said flexible body wrapped about the object;

a respective slider-engaging shoulder flange comprising a part of each of said interlock structures, with said shoulder flanges facing away from the edges of the body, extending substantially normal to said outer face and adapted to be engaged by slider surfaces for maneuvering said structures into the lockingly engaged relationship;

said shoulder flange of the second interlock structure comprising a connecting flange having on its outer edge a fastener strip which overlies said first interlock structure:

said strip and said first interlock structure having complementary fastener hooks with planar surfaces by which locking engagement of the structures is effected;

a hook of said first interlock structure being backed against said connecting flange;

a hook of said second interlock structure being backed against said shoulder flange of said first interlock structure when said first and second structures are interlockingly engaged; and said shoulder flange of said first interlock structure projecting from said body substantially the same distance as the fastener hooks of said first structure.

2. In combination with an elongated object having a circumference:
- a one-piece, extruded plastic wrap member having a sheet-like flexible body wrapped about the object as a sheath with an object-embracing inner face engaging said circumference and with an opposite outer face directed away from said circumference;
- said body having opposite longitudinal edges in a confronting edge-to-edge joint and with said inner face backed in coplanar relation against the object at both sides of the joint;
- a first interlock structure on said outer face adjacent to and along one of said edges and backed against said object through the margin of said body having said one edge;
- a second and complementary interlock structure connected to said outer face along the other of said edges and extending therebeyond in overlying relation to said first-mentioned interlock structure and lockingly engaged therewith and thereby maintaining the member wrapped about said object;
- said first interlock structure comprising a plurality of zipper hooks one of which extends in alignment along said one edge and a second of which is spaced therefrom away from said edge with the hooks having heads with teeth portions extending away from said edge and provided with planar surfaces which extend obliquely toward the planes of said faces;
- a first interlock structure slider shoulder and hook back-up flange projecting substantially the same distance as said hooks and being in spaced relation and parallel to the second hook;
- said second interlock structure comprising a connecting flange along and aligned with said other of said edges and having a fastener strip on its outer end which overlies said first interlock structure;
- said fastener strip having interlock hooks complementary to said first-mentioned interlock hooks said first-mentioned hooks and said shoulder flange providing recesses receptive of the complementary interlock hooks which fit in the recesses with said connecting flange in backing relation to said one hook along said one edge;
- said shoulder flange of the first interlock structure serving as a back-up for one of the hooks on said fastener strip;
- said hooks being effectively held against turning from their interlocked relation by and between said flanges and by the backed relation of said flexible body against said object along said joint;
- said flanges having outer faces extending substantially normal to said body and facilitating engagement of the interlock structures in slider grooves.

3. A combination according to claim 2, said body being elastic and under at least slight tension in engagement with said object to assure a tight fit therewith.

References Cited

UNITED STATES PATENTS

| | | | |
|---|---|---|---|
| 2,013,071 | 9/1935 | Sipe | 24—201 C UX |
| 2,355,816 | 8/1944 | Morner | 24—201 C UX |
| 2,602,208 | 7/1952 | Gossner | 24—201 C |
| 2,652,611 | 9/1953 | Jaster | 24—201 C |
| 2,739,089 | 3/1956 | Hageltorn | 24—201 C UX |
| 2,941,027 | 6/1960 | Svec | 24—201 C UX |
| 3,373,464 | 3/1968 | Ausnit | 24—201 C |

FOREIGN PATENTS

| | | | |
|---|---|---|---|
| 1,204,546 | 1/1960 | France | 24—201 C |
| 304,700 | 4/1955 | Switzerland | 24—201 C |

BERNARD A. GELAK, Primary Examiner

U.S. Cl. X.R.

24—201; 138—168; 161—48, 118, 149; 174—Dig. 11, 68 C